(12) United States Patent
Kubo et al.

(10) Patent No.: US 6,744,513 B2
(45) Date of Patent: Jun. 1, 2004

(54) COMPUTER COLOR MATCHING METHOD OF PAINT AND PREPARING METHOD OF PAINT USING THE SAME METHOD

(75) Inventors: Nobuaki Kubo, Osaka (JP); Mitsuaki Ito, Osaka (JP); Masayuki Fukuda, Osaka (JP); Masayuki Osumi, Aichi (JP); Makoto Ishikawa, Aichi (JP)

(73) Assignees: Nippon Paint Co., Ltd., Osaka (JP); Nisshinbo Industries, Inc., Tokyo (JP)

( * ) Notice: Subject to any disclaimer, the term of this patent is extended or adjusted under 35 U.S.C. 154(b) by 156 days.

(21) Appl. No.: 10/059,162

(22) Filed: Jan. 31, 2002

(65) Prior Publication Data

US 2002/0149770 A1 Oct. 17, 2002

(30) Foreign Application Priority Data

Feb. 2, 2001 (JP) .......................................... 2001-27522

(51) Int. Cl.$^7$ ................................................. G01J 3/46
(52) U.S. Cl. .................... 356/402; 356/405; 356/408
(58) Field of Search ................................ 356/402, 405, 356/408

(56) References Cited

U.S. PATENT DOCUMENTS

| | | | | |
|---|---|---|---|---|
| 4,511,251 A | * | 4/1985 | Falcoff et al. | 356/410 |
| 5,559,173 A | * | 9/1996 | Campo et al. | 356/409 |
| 5,907,495 A | * | 5/1999 | Snyder et al. | 356/405 |
| 5,929,998 A | * | 7/1999 | Kettler et al. | 356/405 |
| 6,064,487 A | * | 5/2000 | Kettler et al. | 356/402 |
| 6,539,325 B1 | * | 3/2003 | Numata et al. | 356/402 |
| 2001/0043329 A1 | * | 11/2001 | Hustert | 356/402 |

FOREIGN PATENT DOCUMENTS

JP 2001-50891 2/2001

* cited by examiner

*Primary Examiner*—F. L. Evans
*Assistant Examiner*—Kara Geisel
(74) *Attorney, Agent, or Firm*—Westerman, Hattori, Daniels & Adrian, LLP

(57) ABSTRACT

A computer color matching method of paint for measuring a proper formulation of colorants for obtaining a target color or color and luster, or a proper formulation of colorants and luster color materials, directly in a liquid state of paint, without preparing painted panels from adjusted paint, and calculating the adjusted blending ratio easily and accurately, and a paint manufacturing method by using this method.

16 Claims, 1 Drawing Sheet

US 6,744,513 B2

COMPUTER COLOR MATCHING METHOD OF PAINT AND PREPARING METHOD OF PAINT USING THE SAME METHOD

BACKGROUND OF THE INVENTION

1. Field of the Invention

The present invention relates to a color matching method when preparing a paint. More specifically, the invention relates to a method of computing the blend of plural colorants of same color and same luster as target color (or sample color) and one or plural luster color materials in a metallic and pearlescent paint (in this specification, the metallic and pearlescent paint includes both a general metallic paint, and a metallic and pearlescent paint adding a special luster color material for expressing a pearlescent effect such as mica pigment to the metallic paint), or the blend of colorants of same color as the target color in a solid color paint, by computer processing, and rationalizing the adjusting means of colors when preparing a paint.

2. Description of the Related Art

When toning a paint, the desired color must be reproduced rationally. For this purpose, in a conventional computer color matching system, the spectral reflectance of sample painted panel for primary data is measured to obtain the spectral reflectance of sample painted panel as primary data, while the calculated reflectance of color adjusted by blending plural colorants presented for coloring (adjusted color) is determined by using Kuberka-Munk optical density formula, and the absorption coefficient and scattering coefficient of visible light region are calculated from the reflectance, and the spectral reflectance when blending the colorants at a specified ratio is predicted and computed, and the calculated reflectance of adjusted color and reflectance of sample color are compared, and the blend of colorants is computed so that the adjusted color may coincide with the sample color. In this comparison, if the difference between the sample color and adjusted color is more than specified, the blend of colorants used in adjusted color is changed until the difference settles within a specified range. When the difference settles within a specified range, this blending ratio is determined as the blend value of the desired color, specifying the sample color as the target color.

In this computer color matching of paint, the sample painted panel which is the sample for obtaining primary data is a blend sample combining a chromatic colorant presented as a toning colorant to be matched with the target color, and a white pigment or luster color material to be used in combination with the toning colorant to be matched with the target color, and this sample is used as the specimen for obtaining data expressing the coloring property of the chromatic colorant to the white pigment or luster color material.

That is, for calculated computation of reflectance when blending plural chromatic colorants and white pigment or luster color material, the preliminarily measured spectral reflectance of primary data is converted into optical density K/S expressed by the ratio of absorption coefficient K and scattering coefficient S of coloring layer as film by using Kuberka-Munk formula, and the optical density in blending K/S is determined by two-constant method of Duncan's color mixing theory, and it is further converted into the reflectance and the calculated reflectance is determined by computation.

At this time, to enhance the precision of prediction, it is converted into the reflectance in ideal state by using Sanderson's formula for correcting effects on measurement of spectral reflectance due to inner mirror reflection or refractive index difference occurring at the interface of resin layer of film and air layer, and color mixing is computed. In order to match the blend of colorants with the target color, the adjusting method of blending ratio of colorants is realized by iterative computation by Newton-Lampson method, and further to evaluate the color coincidence of target measured reflectance and calculated reflectance, by using the color values computed from the reflectance, XYZ, L*a*b*, etc., convergence is computed by Newton-Lampson method while evaluating the difference between target value and calculated value in the metameric method, or convergence is computed while evaluating the square sum of the difference of target measured reflectance and calculated reflectance in the isomeric method.

In the prior art, blending of colorants conforming to the target color by using the computer color matching system by the above technique is computed in a specific condition, such as constant film thickness, constant base color, and constant other specific coating condition. According to the blending ratio thus obtained, an actual paint is prepared, and a painted panel is prepared according to desired conditions from the colored sample by this prepared paint, and the colored sample formed on the painted panel and the target sample are compared in color successively, and in the metallic and pearlescent paint, in addition to comparison of color, the luster of the adjusted sample is compared with the desired luster. In this comparison, when the color is not sufficiently matched, or in the metallic and pearlescent paint, if the luster is not matched sufficiently in addition to the color, the computer color matching is attempted again for correction, or colorants not matched sufficiently are blended, or in the metallic and pearlescent paint, in addition to blending of colorants, blending of luster color materials is judged visually and empirically, and is adjusted according to an empirical rule. This adjustment process is repeated until matching sufficiently with the target color and desired luster.

In the prior art, a painted panel is formed in a specific condition from the paint being adjusted in the paint manufacturing process, and by measuring its color value, computer color matching is repeated, and trials based on visual and empirical evaluation must be repeated. In such technique, in order to obtain a desired color, or color and luster, a painted panel from the paint adjusted each time must be prepared, and effects of repeatability cannot be ignored, and it takes much time and labor in preparing each painted panel, and an exclusive equipment is needed for preparing painted panels.

SUMMARY OF THE INVENTION

In the light of the problems of the prior art, it is hence an object of the invention to present a computer color matching method of paint and a preparing method of paint by using this method capable of computing the adjusted blending ratio easily and accurately, without preparing painted panels from adjusted paint, by measuring a proper blend of colorants for obtaining a desired color, or color and luster, or a proper blend of colorants and luster color materials, directly in a state of adjusted paint.

DESCRIPTION OF THE PREFERRED EMBODIMENTS

Figure 1:
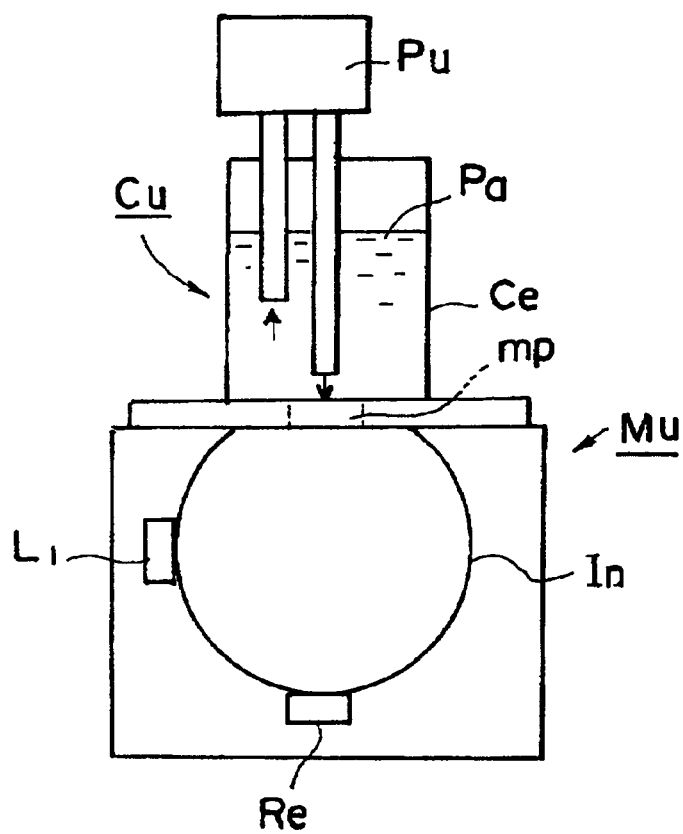
FIG. 1 is a front view schematically showing an example of paint colorimetric equipment used in color matching method of the invention.

To achieve the object, the invention according to a first aspect is a color matching method in which the blending ratio of colorants and luster color materials to conform to the target color or target color and luster is determined by computer computing when preparing a paint composed of plural colorants and luster color materials in a metallic and pearlescent paint or when preparing a paint composed of plural colorants in a solid color paint, the color of adjusted paint blended as adjusted color is measured by paint color measuring means without preparing painted panels from the paint, and the blending ratio of colorants or the blending ratio of colorants and luster color materials is determined by computer computation on the basis of the colorimetric data and the primary data of target color, and it is a second aspect thereof to judge automatically whether the spectral reflectance of the paint adjusted at the determined blending ratio in this state is within an allowable range of a predetermined spectral reflectance of target color or not.

The spectral measuring means of the paint used in this color matching method is realized, for example, by using an apparatus disclosed in Japanese Patent Application No. 11-224833 (Color measuring method for liquid and its apparatus), and other spectral colorimetric device of paint of a proper type. In a specific example of colorimetric means, the paint to be measured is continuously supplied into the measuring position set on a light source of an sphere, the reflected light from the paint at the measuring position is measured in the receiving unit set on the sphere, and colorimetric data is obtained by spectral analysis.

A practical apparatus of this colorimetric means is explained specifically by referring to FIG. 1. This apparatus comprises a glass cell Ce to be filled with paint, a circulation unit Cu for discharging and circulating the paint Pa in the cell Ce by a pump Pu, and a measuring unit Mu including an sphere In having a light source Li and a receiving unit Re, and it is designed to measure while continuously updating the paint Pa in the measuring position mp in the cell Ce contacting with the sphere In by the circulation unit Cu for discharging and circulating the paint. Herein, the paint is discharged toward the surface including the measuring position mp of the cell Ce. The discharging and circulating unit has a pump Pu (for example, tube pump). Further, it may be also designed to automate filling of the cell Ce with paint Pa, or cleaning of the cell Ce.

In this configuration, since painted panels are not prepared in the method of the invention, an accurate adjusted blending ratio for obtaining a target color can be obtained without having effects of repeatability, and the time and labor required for preparing painted panels can be substantially curtailed. This advantage contributes to rationalization of paint manufacturing process, shortening of term of delivery, and reduction of manufacturing cost. Moreover, since the precision of computation of adjustment and blending can be enhanced by the method of the invention, unlike the prior art, it does not require manufacture of multiple paint samples for adjustment. Further, the painted panel preparing equipment is not needed, and the expenses are saved and the paint factory layout is rationalized. In addition, in a factory manufacturing multiple types of paints, when realizing rationalization of toning by color matching apparatus, primary data according to each type of paint must be prepared, and this data compilation takes much time and labor, and the compilation load of primary data is excessive, and toning by color matching apparatus may not be realized.

According to the method of the invention, however, since the paint is directly measured, effects are only small on the color of the paint due to difference in paint resin type by various solvents abundantly contained in the paint, and hence the primary data can be commonly used, and the number of compilations of required primary data can be extremely decreased. In measurement of primary data in the state of paint, as compared with the case of preparing painted panels, influences of resin type are smaller, and color matching computation of much higher precision is realized.

Computation mechanism by the method of the invention is explained. A feature of computation mechanism of the invention lies in a calculated computation mechanism for computing the color value from the blend of plural colorants and luster color materials of paint sample, and on the basis of this mechanism, when toning a paint composed of plural colorants and luster color materials, it realizes a blending ratio computation for inversely computing the blending ratio of proper colorants and luster color materials for conforming to the color value of the target color. In the invention, meanwhile, to enhance the precision of calculated computation and realize blending computation at high precision, a preliminarily obtained arbitrary blending ratio of plural colorants and luster color materials and the spectral reflectance of paint sample are stored in the computer memory, and it is preferred to comprise an adjustment computation mechanism for adjusting the membership function of fuzzy inference for correcting the difference between the color value predicted and computed depending on the condition and that of the sample by fuzzy inference, and a fuzzy inference mechanism for correcting the color value of predicted color determined in the calculated computation process by using the determined membership function.

A first mechanism of computation in the method of the invention is explained.

Generally, when predicting and computing the spectral reflectance from the plural colorants and white pigment presented for blending of an ordinary paint (or solid color paint) not containing luster color material, it is required to determine the absorption coefficient and scattering coefficient in the measuring wavelength region of measured spectral reflectance of each colorant. Techniques for determining the absorption coefficient and scattering coefficient include Kuberka-Munk optical density formula the two-constant method by Duncan's color mixing theory. Kuberka-Munk optical density is to compute the ratio of absorption coefficient and scattering coefficient from the reflectance. For color mixing computation by using Duncan's color mixing theory, the absorption coefficient and scattering coefficient must be determined individually. To determine the absorption coefficient and scattering coefficient, the relative method and absolute method are known, and in the relative method, assuming the scattering coefficient of white pigment to be 1, relatively, the absorption coefficient of white pigment and absorption coefficient and scattering coefficient of color pigment are determined. In the absolute method, a coat film of a specified thickness is formed on a white undercoated and a black undercoated, and each is measured, and the scattering coefficient and absorption coefficient are determined absolutely. Further, since the film may cause mirror reflection at the interface with the air, or also cause mirror reflection in the inside due to difference in refractive index between the air and coat film, thereby decreasing the reflected light, and Sanderson's formula is known to convert it into an ideal reflectance.

The computation formula in the metallic and pearlescent paint in the invention is explained. Herein, the method of computation is explained about an example of using a spectro-photometer of sphere system as measuring means of spectral reflectance. In the spectro-photometer, the irradiation light used in measurement is diffused and illuminated by the sphere, and the spectral reflectance is measured in the wavelength of the visible light region. The measured reflectance is expressed as follows.

$$R = R(\lambda)$$

where

R: spectral reflectance $\lambda$: wavelength

Generally, the measured value by spectro-photometer is calibrated by assuming the perfect diffusion surface of barium sulfate to be 100% reflectance. That is, after calibration, the measured result is as follows.

$$R_{BaSO4}(\lambda) = 1$$

where $R_{BaSO4}$: spectral reflectance when measuring perfect diffusion surface of barium sulfate $$^*R_M = R_M(\lambda)/R_{A1}(\lambda)$$

where $^*R_M$: effect of front reflected portion, that is, stray portion in receiving unit $R_M(\lambda)$: measured reflectance of mirror $R_{A1}(\lambda)$: real reflectance of aluminum Therefore, the actually measured spectral reflectance is corrected as follows in a first stage.

$$R(\lambda) = R_R(\lambda) - ^*R_M(\lambda)$$

where $R(\lambda)$: spectral reflectance after correction $R_R(\lambda)$: measured reflectance $^*R_M(\lambda)$: stray portion determined from result of measurement of complete mirror In the case of metallic and pearlescent paint, the transmissivity of colorant in the paint is high, and in the paint of such property, color matching computation is impossible in the conventional computation of reflectance on the basis of Kuberka-Munk optical density formula. Accordingly, the following method is employed as a method of measuring by spectro-photometer and computing the color mixing.

First, primary data for computing the reproduced spectral reflectance mixing color matters and luster color materials at a specified ratio is compiled in the following manner. Primary data of luster color material is expressed in the following formula.

$$R_B = R_B(\lambda, C_B)$$

where $R_B$: spectral reflectance of primary data of luster color material.

$C_B$: volume formulation ratio of luster color material in paint formulation ($0 \leq C_B \leq 1$)

Generally, a paint includes resin, solvent and additives. In a metallic and pearlescent paint, since the spatial density of luster color material has a large effect on the color expression, $C_B$ in the above formula must be a volume formulation ratio. It can be easily determined from the volume of the paint not containing colorant and luster color material, and the specific gravity of the luster color material. In primary data of colorant, since the spectral absorption coefficient is relatively large and the transmissivity is high in the colorant component alone, it is difficult to measure the reflectance in the paint not containing luster color material at all. Further, since substantial data including mutual action with luster color material is not obtained, a standard luster color material is selected, for example, one near the mean particle size among aluminum component, and a sample for primary data is prepared by blending it.

$$R_G = R_G(\lambda, C_{BS}, C_G)$$

$$C_{BS} + C_G = 1$$

where $R_G$: spectral reflectance of primary data of colorant $C_{BS}$: volume formulation ratio in paint formulation of standard luster color material $C_G$: volume formulation ratio in paint formulation of colorant A predicting method of spectral reflectance when blending only a luster color material in a certain prescribed amount is explained. Concerning reflection of luster color material, the following model is applied. That is, inside of a paint layer, as the observation light is emitted, the luster color material reflects in scatter state at various angles depending on the shape and coating condition. The emitted light getting gap of luster color material is trapped in the gap. Supposing the energy of emitted light to be $I_i$ and the energy of observed light to be $I_0$, in a sufficiently concealed state in the paint layer, $$I_0(\lambda) = I_i(\lambda) \times C_{ori}(\lambda) \times \{1 - T_{trap}(\lambda, x)\} \times R_m(\lambda)$$

$$R_{true}(\lambda, x) = I_0(\lambda)/I_i(\lambda) \times C_{ori}(\lambda) \times \{1 - T_{trap}(\lambda, x)\} \times R_m(\lambda)$$

where $I_i(\lambda)$: incident energy of observation light at wavelength $\lambda$ $I_0(\lambda)$: reception energy of observation light at wavelength $\lambda$ $C_{ori}(\lambda)$: orientation function of light by luster color material $T_{trap}(\lambda)$: trap efficiency of observation light at luster color material concentration x x: luster color material concentration $R_{true}(\lambda, x)$: reflectance at wavelength $\lambda$, luster color material concentration x in ideal state $R_m(\lambda)$: real reflectance of luster color material What is determined in this state is the reflectance in ideal state, and actually correction for stray is necessary. It is also required to add correction due to effects of surface reflection and the internal refractive index of resin containing in the paint.

In primary data of luster color material, only by measuring the ideal reflectance $R_{true}(\lambda, x)$, the spectral reflectance by blending plural luster color materials cannot be determined. In this primary data, as a relative value for standard luster color material, the trap efficiency contributing to scatter must be determined. Supposing the ideal reflectance by a standard luster color material to be $R_{true,s}$ $$C_{ori,S}(\lambda) = R_{true,S}(\lambda, 1)/R_{true,S}(\lambda, 1)$$

$$T_{trap,S}(\lambda, x) = 1 - R_{true,S}(\lambda, x)/R_{true,S}(\lambda, 1)$$

$C_{ori,S}$ (1) and $T_{trap,S}$ (1, x) are determined, and from $R_{m,S}(\lambda, x) = R_{true,S}(\lambda, x)/\{C_{ori,S}(\lambda) \times \{1 - T_{trap,S}(\lambda, x)\}\} R_{m,s}(\lambda, x)$ is calculated. When plural luster color materials are blended, the calculated reflectance is as follows.

$$R_{true,M}(\lambda, x_1, x_2, \ldots, x_n) = \sum \{C_{ori,n}(\lambda, x_n) \cdot x_n\} / \sum x_n \times$$
$$\{1 - \sum \{T_{trap,n}(\lambda, x_n) \cdot x_n\} / \sum x_n \times$$
$$\sum \{R_{m,n}(\lambda, x_n) \cdot x_n\} / \sum x_n$$

When colorants are blended, the spectral reflectance is predicted and computed as follows. Primary data of colorant is measured in a form mixed with luster color material. At concentration x of luster color material and concentration y of colorant, same as in the case of primary data of luster color material, when the surface reflection and internal mirror reflection are corrected after measurement, supposing $$R_{true,G}(\lambda, x, y)$$

the absorption A by colorant is $$A = R_{true,GM}(\lambda, x, y) - R_{true,G}(\lambda, x)$$

The following relation is established between the absorption A and transmissivity T.

$$T = A - 1$$

A colorant in metallic and pearlescent type is high in transmissivity and low in scattering ability, and the Lanbert-Beer rule established, $$Abs_{true,G}(\lambda, x, y) = -\log(T)$$

A this time, considering optical path length of paint layer, $$Abs_{true,G}(\lambda, x, y) = L_{true,M}(x) \cdot y \cdot Abs_{true,Gu}(\lambda)$$

where $L_{true,M}(x)$ optical path length depending on luster color material in paint $Abs_{true,GU}(\lambda)$: real absorption spectrum of colorant Meanwhile, $L_{true,M}(x)$ is determined by using a standard colorant about the luster color material used in the paint. When plural luster color materials and plural colorants are blended, a calculated spectral reflectance is as follows.

$$Abs_{true,GM}(\lambda, x_n, y_n) = \cdot L_{true,n}(x_n) / \sum x_n \cdot \sum \{y_n \cdot Abs_{true,GnU}(\lambda)\}$$
$$T = pow\{10, -Abs_{true,GM}(\lambda, x_n, y_n)\}$$
$$R_{true,GM}(\lambda, x_n, y_n) = R_{true,G}(\lambda, x_n, y_n) - (1 - T)$$

The following explanation relates to a fuzzy inference mechanism for correcting the difference from the predicted and computed spectral reflectance over the entire measuring wavelength region by fuzzy inference, and an adjustment computation mechanism for adjusting the membership function presented for this computation, in a second mechanism of computation. The calculated spectral reflectance determined in the formulas explained in the first mechanism of computation is merely an estimated value, and it is difficult to obtain an accurate and practical blend by using this value only. Accordingly, the value of this computation formula is corrected by fuzzy inference from the spectral reflectance of paint of known blend preliminarily registered in the computer memory.

This method of correction is explained in detail. In the fuzzy inference, the ambiguity is defined by suing a membership function in a fuzzy set theory. That is, a fuzzy set A in a universal set U is defined by the membership function $\mu_A$ $$\mu_A : U \rightarrow [0, 1]$$

and the value $\mu_A$ (u) ($\in [0, 1]$) expresses the grade of u($\in U$) in A.

When applied in inference, the fuzzy production rule is widely employed. This production rule R is composed of a first half and a second half, and it is generally expressed in the following formula (an example of two first half parts and one second half part).

$$R_i: \text{if } X_1 \text{ is } A_{i1} \text{ and } x_2 \text{ is } A_{i2} \text{ then } y \text{ is } B_i (i=1, 2, n)$$

where $x_1$: concept of first half part 1

$x_2$: concept of first half part 2

$A_{i1}$: i-th membership function of first half part 1 (fuzzy label)

$A_{i2}$: i-th membership function of first half part 2 (fuzzy label)

y: concept of second half part

B1: membership function of second half part (fuzzy label)

Various methods have been proposed so far about specific method of fuzzy inference, and the most representative method is proposed by Mandani. Supposing the observation values of first half parts to be $x_1^0$, $x_2^0$, the goodness of fit $\omega_i$ of i-th rule is $$\omega_i = A_{i1}(x_1^0) A_{i2}(x_2^0) \wedge A_{i2}(x_2^0)$$

and the output is $$B^0(y) = [\omega_1 \wedge B_1(y)] \vee [\omega_2 \wedge B_2(y)] \vee \ldots \vee [\omega_n \wedge B_n(y)]$$

$$Y^0 = \int B^0(y) y \, dy / \int B^0(y) \, dy$$

where $B^0()$: function of inference result of membership function of second half part $y^0$: non-fuzzy output result of inference output This formula shows calculation of coordinates of the center of gravity in the case of non-fuzzy inference. Several methods are proposed for non-fuzzy inference.

It is an object of the invention to determine the blending of colorants $x_1, X_2, X_3, \ldots x_i$ to achieve the desired spectral reflectance and the sum $\Sigma y_j$ of luster color materials. Therefore, when the spectral reflectance to blending of colorants and luster color materials can be predicted and computed correctly, the precision of computation of blending is enhanced. For this purpose, the following formula can be considered.

$$R(\lambda, x_1, x_2, \ldots x_i, x_w, \sum y_j) =$$
$$R_t(\lambda, x_1, x_2, \ldots x_i, x_w, \sum y_j) + Corr(\lambda, x_1, x_2, \ldots x_i, x_w, \sum y_j)$$

where $R_1$: calculated reflectance at wavelength $\lambda$ $x_1, x_2, \ldots, x_i$: blend of i types of colorants $x_w$: blend of white pigment $\Sigma y_j$: sum of j types of luster color materials $R_t$: purely theoretical calculated reflectance at wavelength $\lambda$ Corr: correction amount calculated by fuzzy inference by correction function of reflectance at wavelength $\lambda$ Corr is a correction function by the mechanism of fuzzy inference, and in the fuzzy production rule for fuzzy inference, the first half is composed of i types of colorants+ sum of luster color materials, that is, i+1 cases, and the second half is composed of 1 case of correction value only. For example, assuming three types of colorants and one type of luster color material, the fuzzy inference is composed of four first half parts and one second half part.

The fuzzy label of first half is an expression of "large" or "small" in the case of colorant, white pigment, and luster color material, and its degree is further included. In the case of a paint, since the total of blend of colorants and blend of white pigment is always 100, and in the space of the first half, only the blend of colorant is considered, and the blend of white pigment is ignored. The blend of colorants may be simply expressed in a system of orthogonal coordinates, but in the case of this inference, it is expressed in a system of coordinates combining the total blend value of color pigments and the blending ratio of each color pigment in the total value. That is, in the case of three types of colorants, it is expressed in triangular prism coordinates by combining the axis expressing the total blend value, and regular triangular coordinates expressing the blend of each pigment to the color pigment total value.

The total value of blending ratio ranges from 0 to 100, and the fuzzy membership function of the first half is divided in n sections (n being 2 or more) from 0 to 100. Although divisions may be made at equal intervals, in a pale color region in which the total blend value of colorants is relatively small, a slight blend fluctuation may have a large effect on the color, or in a deep color region in which the total blend value of colorants is relatively large, to the contrary, a blend fluctuation has only a small effect on the color, and therefore it is more effective to vary the degree of degrees by an exponential function so that the divisions may be dense in the pale color region and sparse in the deep color region.

In the inference space of the first half, the sum $\Sigma y_j$ of luster color materials is added to the blend space of colorants.

As for the luster color materials, in most cases, the range of addition amount is limited, and the maximum addition amount is assumed, and it is divided at equal intervals, or at uneven intervals by exponential function same as in the case of the total blend value of colorants, and the fuzzy labels are set accordingly.

In the case of three types of colorants and one type of luster color material, the fuzzy labels at wavelength $\lambda$ may be summarized as follows.

$$x_1^0 = x_1/(x_1+x_2+x_3)$$

$$x_2^0 = x_2/(x_1+x_2+x_3)$$

$$x_3^0 = (x_1+x_2+x_3)/100$$

$$x_4^0 = y_g/y_{gmax}$$

where $x_1$: blend of first colorant $x_2$: blend of second colorant $x_3$: blend of third colorant $y_g$: sum of luster color material $y_{gmax}$: assumed maximum addition amount of luster color material $x_1^0$: observation value of blending degree of first colorant in all colorants $x_2^0$: observation value of blending degree of second colorant in all colorants $x_3^0$: observation value of blending degree of magnitude of all colorants $x_4^0$: observation value of degree of addition of luster color material The membership functions for fuzzy inference of four observation values are $A_{i1}, A_{i2}, \ldots, A_{i4}$. Since all observation values $x_1^0, x_2^0, \ldots, x_4^0$ are normalized in a range of [0, 1], these functions are divided in n1 sections at equal intervals or uneven intervals, as required, similarly in a range of [0, 1], and the membership function is formed at the division point. The outer profile of the membership function is proposed in several types such as exponential profile, but considering the simplification of computation and smoothness of output value obtained by fuzzy inference, a triangular profile is most effective. The fuzzy production rule for fuzzy inference is as follows.

$R_i$: if $F_1$ is $A_{i1}$ and $F_2$ is $A_{i2}$ and $F_3$ is $A_{i3}$ and $F_4$ is $A_{i4}$ then $y$ is $B_i (i=1,2,\ldots,n)$ where y is the output concept of second half, which expresses the degree of difference between the optical density calculated from the measured spectral reflectance of painted panel prepared in a certain condition, and the optical density theoretically calculated from the preparing condition, and $B_i$ is the membership function of the i-th second half part.

The difference y of the measured reflectance and theoretical reflectance is calculated according to the definition of the following formula.

$$y = R_{T\lambda}/R_{R\lambda}$$

where $R_{T\lambda}$: optical density at wavelength $\lambda$ determined from theoretical computation $R_{R\lambda}$: optical density at measured wavelength $\lambda$ In this case, it is easy to set the range of values of y, and to assure smoothness of the result of inference. For example, assuming the range of y in [0.2, 2.0], this range is divided in n sections at equal intervals or uneven intervals, and the membership function in the second half is specified. In the case of uneven divisions, it is effective to divide at dense intervals near 1.0, and at sparse intervals near the minimum or maximum value of the range.

In the invention, the membership function of the second half is stored in the computer memory together with the preparing condition of painted panels preliminarily prepared in the condition of n points and the measured reflectance, and the membership function of the second half and the fuzzy production rule are adjusted by using this information so as to obtain a correct fuzzy output y. For the ease of this adjustment, in the non-fuzzy inference method by determining the coordinates of the center of gravity, at the time of adjustment computation, regression calculation of higher degree function is needed, and it is practically impossible.

In the invention, accordingly, it is calculated by using a non-fuzzy technique by simple height method. In the height method, membership function does not spread in the output concept y, and it is a function of only the position on the y-axis and its height. At this time, the inference is expressed in the following formula.

$$B^0(y_i) = [\omega_1 \wedge B_1(y_c)] \vee [\omega_2 \wedge B_2(y_1)] \vee \cdots \vee [\omega_n \wedge B_n(y_1)]$$

$$Y^0 = \sum B^0(y_i)y_i / \sum B^0(y_i)$$

Adjustment of membership function of second half and adjusting method of fuzzy production rule are explained below.

First Stage of Adjustment

If the number of pieces of information composed of measured reflectance of painted panels prepared in a certain condition and its condition stored in the computer memory is small, that is, by converting the condition into the observation value, if there is one piece of information only in a cell of sixth-degree fuzzy label, $B_i$ is set at height 1. In the fuzzy production rule, assuming this cell to be ignited, the production rule $R_i$ is set so that $B_i$ may be obtained from the logic of the first half.

If there are n pieces of data in a cell of fuzzy label, near this cell, the value of Bi in an extrapolated form and the corresponding fuzzy production rule are set in the cell in which the observation is ignited. If there are four first half parts, the number of related adjacent cells is 16 ($=2^4$) at maximum. As a result of inference computation of each membership function $B_i$ in the relating direction of n pieces of data, the position on the y-axis is shifted and set so that the output value and observation value may coincide with each other. This operation is executed on all n pieces of information stored in the computer memory.

Second Stage of Adjustment

The number of fuzzy production rules $R_i$ is obtained by multiplying the product of number of divisions of each degree of the membership function of the first half, by the number of measured wavelengths of the spectral reflectance. Therefore, when each degree of divided by 10, the number of rules is $31 \times 10^4$, which is an enormous number. Therefore, all cells are not ignited practically. In this case, as for the cell not ignited in the first stage of adjustment, the production rule of the ignited cell is interpolated or extrapolated. In this case, the array of fuzzy cells is sixth-degree orthogonal coordinate cells, and the rule is extrapolated.

By this operation, the mechanism for theoretical computation at wavelength $\lambda$ and inference of correction of measured optical density is built up. As a result, an accurate optical density can be predicted, that is, the spectral reflectance can be predicted, and hence the precision of color matching computation for conforming to the target color can be outstandingly enhanced.

Further, when the both correction computation mechanisms of spectral reflectance and flop value by fuzzy inference as the feature of the invention are incorporated in a third mechanism of computation, it is possible to compute accurately the blending amounts of colorants and luster color materials for obtaining the desired color and luster of the paint as the object of the invention.

EXAMPLES

Measuring System

The specification of spectro-photometer used in the examples is as follows.

Minolta CM-3600d

Measuring light source: pulse xenon lamp

Measuring wavelength range: 400 nm to 700 nm

Wavelength intervals: 10 nm

Measuring method: SCI (specular component included)

TABLE 1

Type of paint: Acrylic resin paint
Paint color: Metallic silver

| | Material | Basic blend | Primary charge | First correction | Second correction |
|---|---|---|---|---|---|
| Colorant and Luster | Black | 0.380 | 0.360 | 0.020 | |
| | Red | 0.081 | 0.080 | 0.003 | |
| | White | 0.031 | 0.250 | | |

TABLE 1-continued

Type of paint: Acrylic resin paint
Paint color: Metallic silver

| | | | | | |
|---|---|---|---|---|---|
| color material | Aluminum paste A | 0.254 | 0.258 | | |
| | Aluminum paste B | 0.210 | 0.210 | | |
| Additive | Additive A | 4.123 | 4.120 | | |
| | Additive B | 2.593 | 2.600 | | |
| | Solvent | 1.82 | 1.82 | | |

| | | Reference color value | Color difference | Color difference |
|---|---|---|---|---|
| Color difference | Δ L* | 68.2 | 0.62 | −0.02 |
| | Δ a* | 0.02 | −0.18 | −0.14 |
| | Δ b* | 2.88 | −0.35 | −0.16 |
| | Δ E* | | 0.62 | 0.21 |
| | | | | End of color matching |

TABLE 2

Type of paint: Acrylic resin paint
Paint color: Metallic Red

| | Material | Basic blend | Primary charge | First correction | Second correction |
|---|---|---|---|---|---|
| Colorant and Luster color material | Red A | 1.460 | 1.270 | 0.206 | |
| | Red B | 0.591 | 0.538 | | 0.155 |
| | Black | 0.091 | 0.044 | | 0.026 |
| | White | 0.016 | 0.011 | | |
| | Mica paste | 0.116 | 0.116 | | |
| | Aluminum paste | 0.020 | 0.020 | | |
| Additive | Additive A | 1.281 | 1.281 | | |
| | Additive B | 0.037 | 0.037 | | |
| | Solvent | 0.394 | 0.394 | | |

| | | Reference color value | Color difference | Color difference | Color difference |
|---|---|---|---|---|---|
| Color difference | Δ L* | 30.68 | 0.83 | 0.36 | 0.20 |
| | Δ a* | 25.24 | 0.65 | 0.38 | 0.07 |
| | Δ b* | 8.47 | 0.25 | 0.35 | −0.01 |
| | Δ E* | | 1.08 | 0.63 | 0.21 |
| | | | | | End of color matching |

TABLE 3

Type of paint: Acrylic resin paint
Paint color: Medium metallic blue

| | Material | Basic blend | Primary charge | First correction | Second correction |
|---|---|---|---|---|---|
| Colorant and Luster color material | Black | 31.670 | 31.615 | 2.530 | |
| | Blue | 2.281 | 2.323 | 0.092 | |
| | Red | 0.276 | 0.258 | 0.012 | |
| | White | 0.246 | 0.234 | | |
| | Aluminum paste | 1.728 | 1.640 | | |

TABLE 3-continued

Type of paint: Acrylic resin paint
Paint color: Medium metallic blue

|  |  |  |  |
|---|---|---|---|
| Additive A | 11.680 | 11.680 |  |
| Additive B | 7.245 | 7.245 |  |
| Solvent | 6.375 | 6.375 |  |

|  |  | Reference color value | Color difference | Color difference |
|---|---|---|---|---|
| Color difference | Δ L* | 36.11 | 1.14 | 0.40 |
|  | Δ a* | −1.59 | 0.12 | 0.18 |
|  | Δ b* | −1.71 | −0.18 | −0.08 |
|  | Δ E* |  | 1.16 | 0.45 |
|  |  |  |  | End of color matching |

TABLE 4

Type of paint: Acrylic resin paint
Paint color: Light metallic blue

|  | Material | Basic blend | Primary charge | First correction | Second correction |
|---|---|---|---|---|---|
| Colorant and Luster color material | Black | 7.210 | 7.01 | 0.350 |  |
|  | Blue | 0.770 | 0.710 | 0.020 |  |
|  | Red A | 0.770 | 0.720 | 0.028 |  |
|  | Red B | 0.170 | 0.180 |  |  |
|  | Aluminium paste A | 0.830 | 0.830 |  |  |
|  | Aluminium paste B | 0.830 | 0.830 |  |  |
|  | Mica paste | 0.250 | 0.250 |  |  |
| Additive | Additive A | 44.580 | 44.580 |  |  |
|  | Additive B | 26.290 | 26.600 |  |  |
|  | Additive C | 0.550 | 0.550 |  |  |
|  | Solvent | 17.75 | 17.75 |  |  |

|  |  | Reference color value | Color difference | Color difference |
|---|---|---|---|---|
| Color difference | Δ L* | 54.22 | 0.88 | 0.34 |
|  | Δ a* | −0.53 | 0.05 | 0.00 |
|  | Δ b* | −1.99 | −0.04 | 0.00 |
|  | Δ E* |  | 0.89 | 0.34 |
|  |  |  |  | End of color matching |

What is claimed is:

1. A computer color matching method of paint, being a toning method of determining a blending ratio of colorants and luster color materials conforming to a target color by computation, when color matching a metallic and pearlescent paint composed of plural colorants and luster color materials, said method comprising the steps of:
preliminary measuring the color of a paint, as liquid varied in a volume formulation ratio of usable colorants, and luster color materials as a spectral reflectance by a paint color measuring means;
storing the preliminary measured data in a memory of a computer;
adjusting a color of each one of two or more paints in the blending ratio for realizing a target color which is measured by the paint color measuring means when color matching a metallic and pearlescent paint without preparing painted panels;
predicting and computing a colorimetric value of reproduced color by using the measured data and the preliminary measured data by considering a change in the colorimetric value due to differences in the blending ratio of colorants and luster color materials; and
determining an appropriate blending ratio of colorants and luster color materials by computation.

2. The computer color matching method of paint of claim 1, wherein data of colorimetric values and blending ratio of paint composed of plural colorants and luster color materials in metallic and pearlescent paint is stored in the computer memory when predicting and computing the reproduced color by using a spectral reflectance measured in the method claim 1, and a difference from the colorimetric value predicted by the computing method in claim 1 is adjusted, and fuzzy inference is employed in a means for enhancing the color matching precision.

3. The computer color matching method of paint of claim 1, wherein a colorimetric means of paint supplies the paint continuously to a measuring position, and an illumination light is entitled and reflected to the paint supplied in the position, and the reflected light is examined by spectral analysis.

4. The computer color matching method of paint of claim 1, wherein a colorimetric means of paint supplies the paint continuously to a measuring position, and an illumination light is emitted and reflected to the paint supplied in the position, and the reflected light is examined by spectral analysis.

5. A preparing method of paint for preparing a paint of a target color by applying the color matching method of claim 1 in a manufacturing process of paint, wherein the computer judges if the colorimetric value is within a preset allowable range or not, and the manufacturing process of the target color paint is managed on the basis of this judgment.

6. The preparing method of paint for preparing a paint of a target color by applying the color matching method of claim 2 in a manufacturing process of paint, wherein the computer judges if the colorimetric value is within a preset allowable range or not, and the manufacturing process of the target color paint is managed on the basis of this judgment.

7. The preparing method of paint for preparing a paint of a target color by applying the color matching method of claim 3 in a manufacturing process of paint, wherein the computer judges if the colorimetric value is within a preset allowable range or not, and the manufacturing process of the target color paint is managed on the basis of this judgment.

8. The preparing method of paint for preparing a paint of a target color by applying the color matching method of claim 4 in a manufacturing process of paint, wherein the computer judges if the colorimetric value is within a preset allowable range or not, and the manufacturing process of the target color paint is managed on the basis of this judgment.

9. A computer color matching method of paint, being a color matching method of determining a blending ratio of colorants conforming to a target color by computation, when color matching a solid color paint composed of plural colorants, said method comprising the steps of:
preliminary measuring the color of a paint, as liquid varied in the blending ratio of usable colorants, as a spectral reflectance by a paint color measuring means;
storing the preliminary measured data in a memory of a computer;
adjusting a color of each one of two or more paints in the blending ratio for realizing a target color, which is measured by the paint color measuring means when color matching a solid color paint without preparing painted panels;

predicting and computing a colorimetric value of reproduced color by using the measured data and the preliminary measured data and by considering a change in a colorimetric value due to difference in blending ratio of colorants; and determining an appropriate blending ratio of colorants by computation.

10. The computer color matching method of paint of claim 9, wherein data of colorimetric values and blending ratio of paint composed of plural colorants in solid color paint is stored in the computer memory when predicting and computing the reproduced color by using the a spectral reflectance measured in the method of claim 9, and a difference from the colorimetric value predicted by the computing method in claim 9 is adjusted, and fuzzy inference is employed in a means for enhancing the color matching precision.

11. The computer color matching method of paint of claim 9, wherein a colorimetric means of paint supplies the paint continuously to a measuring position, and an illumination light is emitted and reflected to the paint supplied in the position, and the reflected light is examined by spectral analysis.

12. The computer color matching method of paint of claim 10, wherein a colorimetric means of paint supplies the paint continuously to a measuring position, and an illumination light is emitted and reflected to the paint supplied in the positions, and the reflected light is examined by spectral analysis.

13. The preparing method of paint for preparing a paint of a target color by applying the color matching method of claim 9 in a manufacturing process of paint, wherein the computer judges if the colorimetric value is within a preset allowable range or not, and the manufacturing process of the target color paint is managed on the basis of this judgment.

14. The preparing method of paint for preparing a paint of a target color by applying the color matching method of claim 10 in a manufacturing process of paint, wherein the computer judges if the colorimetric value is within a preset allowable range or not, and the manufacturing process of the target color paint is managed on the basis of this judgment.

15. The preparing method of paint for preparing a paint of a target color by applying the color matching method of claim 11 in a manufacturing process of paint, wherein the computer judges if the colorimetric value is within a preset allowable range or not, and the manufacturing process of the target color paint is managed on the basis of this judgment.

16. The preparing method of paint for preparing a paint of a target color by applying the color matching method of claim 12 in a manufacturing process of paint, wherein the computer judges if the colorimetric value is within a preset allowable range or not, and the manufacturing process of the target color paint is managed on the basis of this judgment.

* * * * *